United States Patent [19]

Beliles et al.

[11] Patent Number: 4,838,754
[45] Date of Patent: Jun. 13, 1989

[54] METHOD AND APPARATUS FOR CONNECTING A REAR TRAILER IN A TANDEM TRACTOR-TRAILER ASSEMBLY

[75] Inventors: Homer J. Beliles, 4136 Celina Dr., Nashville, Tenn. 37207; M. Dale Cantrell, 6206 Laramie Ave., Nashville, Tenn. 37209; Carl H. Sanders, Ashland City, Tenn.

[73] Assignees: Homer J. Beliles, Nashville; M. Dale Cantrell, Hendersonville, both of Tenn.

[21] Appl. No.: 208,764

[22] Filed: Jun. 20, 1988

[51] Int. Cl.4 ............................................. B60P 3/07
[52] U.S. Cl. .................................... 414/607; 280/402; 280/408; 414/563; 414/663; 414/786
[58] Field of Search ............... 414/607, 563, 626, 672, 414/675, 786, 908, 608, 663; 280/402, 408

[56] References Cited

U.S. PATENT DOCUMENTS

| | | | |
|---|---|---|---|
| 2,699,878 | 1/1955 | Avery | 414/607 X |
| 3,734,328 | 5/1973 | Dalglish | 414/626 X |
| 4,437,807 | 3/1984 | Perott | 414/678 X |
| 4,600,350 | 7/1986 | Matthewson et al. | 414/678 X |
| 4,653,771 | 3/1987 | Gieg | 280/477 |
| 4,664,576 | 5/1987 | Coe | 414/607 X |
| 4,708,358 | 11/1987 | Gehman et al. | 414/563 X |
| 4,768,802 | 9/1988 | Winkler | 280/408 |
| 4,781,516 | 11/1988 | Cripe et al. | 414/563 X |

FOREIGN PATENT DOCUMENTS

| | | | |
|---|---|---|---|
| 486046 | 8/1952 | Canada | 280/408 |
| 1175758 | 8/1985 | U.S.S.R. | 280/402 |

*Primary Examiner*—David A. Bucci
*Attorney, Agent, or Firm*—Harrington A. Lackey

[57] ABSTRACT

A method and apparatus for connecting a rear trailer to a front trailer in a tandem tractor-trailer assembly in which a boom attachment for a lift truck is provided with a vertical rotary lock pin adapted to be secured to a mobile connector carrier for lifting, rotating and moving the carrier to a working position between the front and rear trailers. The boom lift attachment is designed to rotate the mobile connector carrier relative to the lift truck in order to accurately position the mobile connector carrier in a working space between the trailers and to move the carrier into locking engagement with the front trailer, prior to rearward movement of the front trailer to engage the kingpin of the rear trailer with the mobile connector carrier.

8 Claims, 2 Drawing Sheets

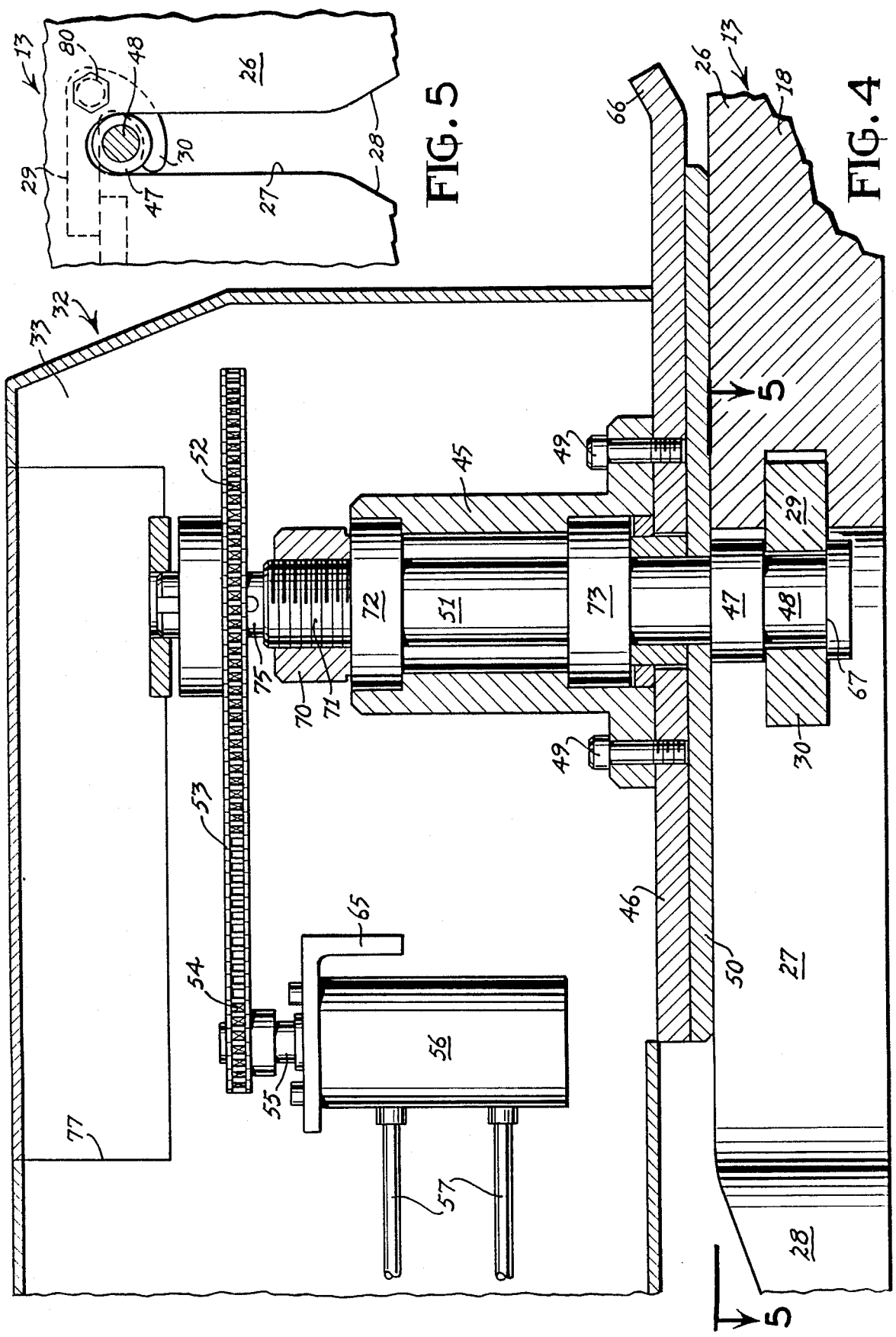

METHOD AND APPARATUS FOR CONNECTING A REAR TRAILER IN A TANDEM TRACTOR-TRAILER ASSEMBLY

BACKGROUND OF THE INVENTION

This invention relates to a method and apparatus for connecting a rear trailer in a tractor-trailer assembly, and more particularly to a method and apparatus for positioning a mobile connector carrier between a front and rear trailer for connection to both trailers.

In the trucking industry, more and more states are permitting the hauling of freight over the road in more than one trailer, connected in tandem with a tractor. The connection of a single trailer to a tractor is relatively simple since the tractor carrying a sloping fifth wheel connector on the rear of its chassis is backed beneath the front end of the stationary trailer until the connector or king pin on the front end of the trailer is properly seated and locked within the slot of the fifth wheel connector. However, the connection of a second trailer to the rear of the first trailer is more involved and takes substantially more time than the connection of one trailer to a tractor. The connection of a second trailer usually requires approximately 45-50 minutes.

In order to assemble two or more trailers in tandem to a tractor, the tractor is first connected to the front end of a front trailer in a conventional manner, that is by backing the tractor beneath the front end of the trailer. However, since conventional trailers are not equipped with fifth wheel connectors, a separate mobile carrier, or dolly, supporting a connector member, and specifically a fifth wheel connector, must be located and connected by its tongue to the cooperating connector on the rear end of the front trailer. This tandem assembly, including the tractor, the trailer, and the mobile connector carrier, one of which is known in the trade as a "JIFFLOX", is driven to a position as close as possible to the front end of a second or rear trailer. Since the assembly cannot be moved rearwardly more than approximately twelve feet without the connector carrier jack-knifing, the operator of the tractor must first manually unhook the carrier from the rear end of the front trailer and push it by hand to a position as close as possible to the front end of the rear trailer. Then the operator returns to his tractor and backs the front trailer slowly and carefully toward the carrier, attempting to stop approximately one foot before the rear end of the front trailer engages the tongue of the carrier. This part of the operation is extremely tedious since the driver or operator must use extreme caution in lining up the front trailer and the carrier with the rear trailer so that after the carrier is re-connected to the front trailer, the carrier does not jack-knife as the front trailer is moved rearwardly to the front end of the rear trailer. Moreover, care must be taken not to strike the tongue of the carrier against the rear end of the front trailer, which is invisible to the operator as the tractor and front trailer move rearwardly.

After the front trailer is moved as close as possible to the carrier, the operator again gets out of the tractor, goes to the rear of the front trailer and manually re-connects the carrier to the rear of the front trailer. The operator again returns to the tractor and backs up the front trailer and mobile connector carrier until the connector or king pin on the front end of the rear trailer is locked in the fifth wheel slot of the carrier by the automatic catch mechanism. All of the vehicles which are elements of the tandem assembly are now connected. The landing gear on the rear trailer is elevated and the air and electric lines are connected to ender the entire tandem assembly road-ready.

The mobile connector carrier, one of which is known as the "JIFFLOX", is relatively heavy, in the order of 3,000 pounds, and requires considerable strength in order to merely pull the carrier forward in order to connect the tongue to the rear end of a front trailer. Occasionally, an operator who pulls the carrier incurs an injury to is back or to his hands.

One attempt to solve the problems in connecting trailers in a tandem trailer assembly is presented in prior U.S. Pat. No. 4,653,771, of Gieg, issued Mar. 31, 1987. In the Gieg system, a laterally shiftable platform must be utilized in order to laterally shift a rear trailer into a position behind a tandem assembly including the tractor, front trailer, and the already manually connected mobile connector carrier or dolly After the rear trailer is shifted into longitudinal alignment behind the tandem assembly, the tandem assembly is moved rearwardly to automatically connect the carrier with the front end of the rear trailer.

The following U.S. patents disclose various types of lift attachments for forklift trucks including a load engaging mechanism rotatable with respect to a boom projecting from the forklift:

U.S. Pat. No. 2,699,878, Bertram Jan. 18, 1955
U.S. Pat. No. 4,474,495, Ledwell, Jr. Oct. 2, 1984
U.S. Pat. No. 4,664,576, Coe May 12, 1987

The Bertram and the Ledwell, Jr. patents disclose load engaging mechanisms which are rotatable about a vertical axis, and provided with a rotary drive mechanism for rotating the load relative to the boom. However, the load engaging mechanism of the Bertram patent is specifically designed for gripping or supporting beneath the opposite side edges of such loads as sheet material, including plaster board, insulation board, plywood, sheet metal, or other sheet material.

The load clamping mechanism of the Ledwell, Jr. U.S. Pat. No. 4,474,495 is designed to engage chicken coops.

The Coe U.S. Pat. No. 4,664,576 is provided with opposed clamping jaws both of which are designed, not only to move toward and away from each other, but jointly about a horizontal axis in order to grip and turn completely over an elongated cargo containing trailer chassis about its longitudinal axis.

None of the above patents disclose any mechanism which could be adapted to, or which would be suitable for engaging a mobile connector tractor, known in the trade as a "JIFFLOX", which could lift the JIFFLOX, rotate it when desired, and position it within the narrow confines of the working space between a front and rear trailer in a tandem tractor-trailer assemble.

SUMMARY OF THE INVENTION

This invention relates to a method and apparatus for connecting a rear trailer in a tractor-trailer assembly, including a tractor, a front trailer and a mobile connector carrier, such as a "JIFFLOX" dolly, by positioning the carrier in a narrow working space between the front and rear trailers.

More specifically, this invention contemplates the prepositioning of a pre-connected tractor and front trailer in front of a rear trailer to define a small working space between the front and rear trailers, and subsequently to lift, transport and position the mobile connector carrier within the working space between the trailer, and to connect the carrier to the front trailer before the front trailer is backed rearwardly to connect the carrier to the rear trailer. The working space between the trailers should just be large enough to maneuver the mobile connector carrier between the trailers.

The apparatus for lifting and positioning the mobile connector carrier includes a boom member or attachment connected to a lift truck, such as the front of a forklift truck, and a rotary connector supported on the free end of the boom attachment which is constructed to be secured or attached to the fifth wheel on the carrier. The rotary connector is driven to selectively rotate the carrier secured to the rotary connector to selective rotary positions relative to the boom attachment.

After the trailers are positioned to establish the working space between the front and rear trailers, the lift truck with its boom attachment is moved to the location of the mobile connector carrier, where the rotary connector on the boom attachment engages and is locked to the carrier. The boom and carrier are then lifted and transported to the working space, where the carrier may be selectively rotated to a working position which will enable it to be positioned within the working space with its tongue forward. The lift truck is then maneuvered to move the carrier slightly forward until the tongue is cooperatively connected to the rear connector or hook on the front trailer. The boom attachment is then disconnected from the carrier and removed from the working space by the movement of the lift truck. The mobile connector carrier, now only a short distance from the rear trailer, is backed rearwardly by the tractor and front trailer until the king pin depending from the front portion of the rear trailer automatically engages and is coupled to the fifth wheel on the carrier. After the raising of the landing gear and the connection of the hydraulic and electrical lines, the assembly is then complete and the tandem assembly is road-ready.

BRIEF DESCRIPTION OF THE DRAWINGS

FIG. 4 is an enlarged fragmentary section taken along the line 4—4 of FIG. 3, showing the fifth wheel of the connector carrier secured to the connector pin of the boom attachment in a lifted position; and FIG. 5 is a reduced fragmentary section taken along the line 5—5 of FIG. 4.

DESCRIPTION OF THE PREFERRED EMBODIMENTS

Figure 3:
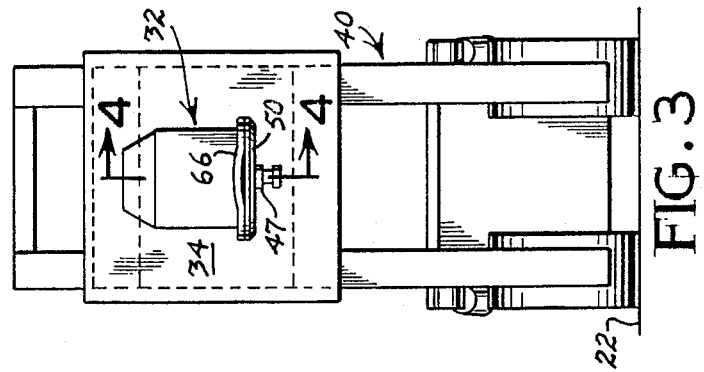
FIG. 3 is a front end elevational view, taken along the line 3—3 of FIG. 2, of the boom attachment mounted on the lift truck, without the mobile connector carrier.
Figure 1:
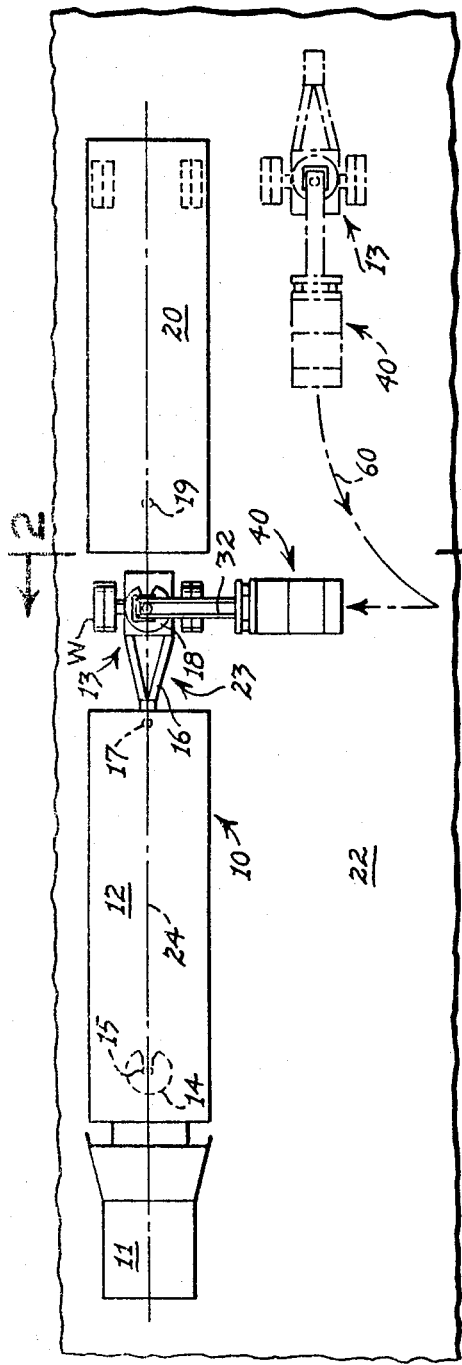
FIG. 1 is a top plan view of the pre-assembled tractor and front trailer and the pre-located rear trailer, and the lift truck and boom attachment secured to the mobile connector carrier in an operative position between the trailers in solid lines, and in a preliminary position disclosed in phantom.

Referring now to the drawings in more detail, FIG. 1 discloses schematically a conventional pre-assembled tractor-trailer tandem assembly 10, including a tractor 11, a front trailer 12, and a mobile connector carrier or dolly 13, one of which is known in the trucking industry as a "JIFFLOX". The tractor 11 is connected in a conventional manner to the front end of the front trailer by a fifth wheel connector 14 and a cooperating pin connector 15 (in phantom). The rear end of the front trailer 12 is disclosed in FIG. 1 as having already been coupled to the tongue 16 of the carrier 13 by a coupling hook mechanism 17 (in phantom). The conventional connector carrier 13 is provided with a fifth wheel 18 for connection to a corresponding connector kingpin 19 (in phantom) depending from beneath the front end portion of a rear trailer 20.

As disclosed in FIG. 1, the front trailer 12 has been pre-connected to the tractor 11 and these pre-connected vehicles have been backed rearwardly into a parking position upon a parking pavement 22 in longitudinal alignment with a pre-parked rear trailer 20, leaving a small working space 23 between the rear end of the front trailer 12 and the front end of the rear trailer 20. The longitudinal dimension of the working space 23 is just long enough to permit the insertion of a mobile connector carrier 13 therebetween in a front-to-rear direction, as illustrated by the carrier position 13. The longitudinal axis 24 of the aligned vehicles 11, 12 and 20 is illustrated in FIG. 1.

The mobile connector carrier 13 further includes a body member or chassis 25 supporting the fifth wheel 18. The fifth wheel 18 includes a generally circular, flat slide plate 26 having an elongated rearward opening slot 27 therein, with rearward diverging cam portions 28. Cooperatively movable within the closed end portion of the slot 27 in the slide plate 26 is an automatic kingpin locking device of conventional construction including a front trigger bar 29 and a rear movable catch 30, as disclosed in FIG. 4.

The fifth wheel slide plate 26 is pivotally mounted on journals 31 on the chassis 25 for swinging movement about a horizontal transverse axis.

The chassis 25 is supported upon ground-engaging wheels W, in a conventional manner.

An elongated boom attachment or boom member 32 includes an elongated, hollow boom housing 33, the rear end of which is rigidly fixed to a vertical mounting plate 34 by welding. Reinforcing gussets may be utilized if necessary. The top rear edge portion of the mounting plate 34 is provided with a transverse hook member 36 adapted to fit or hook over a transverse hanger bar 37 adapted to travel vertically and reciprocably along the mast 38 of a conventional lift truck or forklift truck 40. In the apparatus disclosed in FIG. 2, the conventional forks, not shown, have been removed from the hanger bar 37 and replaced by the transverse hook member 36. The transverse hanger bar 37 and the lower stabilizing transverser bar 41 are mounted in a conventional manner for vertical reciprocable movement and are connected to a conventional mechanism for raising and lowering the bars 37 and 41, such as by the vertically traveling piston 42 driven by the hydraulic cylinder 43 The mast 38 may be tilted forward and rearwardly by operation of the hydraulic tilt cylinder 44.

Mounted in the front end portion of the hollow boom housing 33 is a vertically disposed journal housing 45 fixed to a wear plate 46, defining the front portion of the bottom of the housing 33, by bolts 49, and having a vertical rotary axis. Mounted within the journal housing 45 is an elongated, vertical connector pin or lock pin 47, the lower portion of which is shaped like a conventional kingpin utilized for cooperative engagement with a fifth wheel and having a lower annular recess 48.

Figure 2:
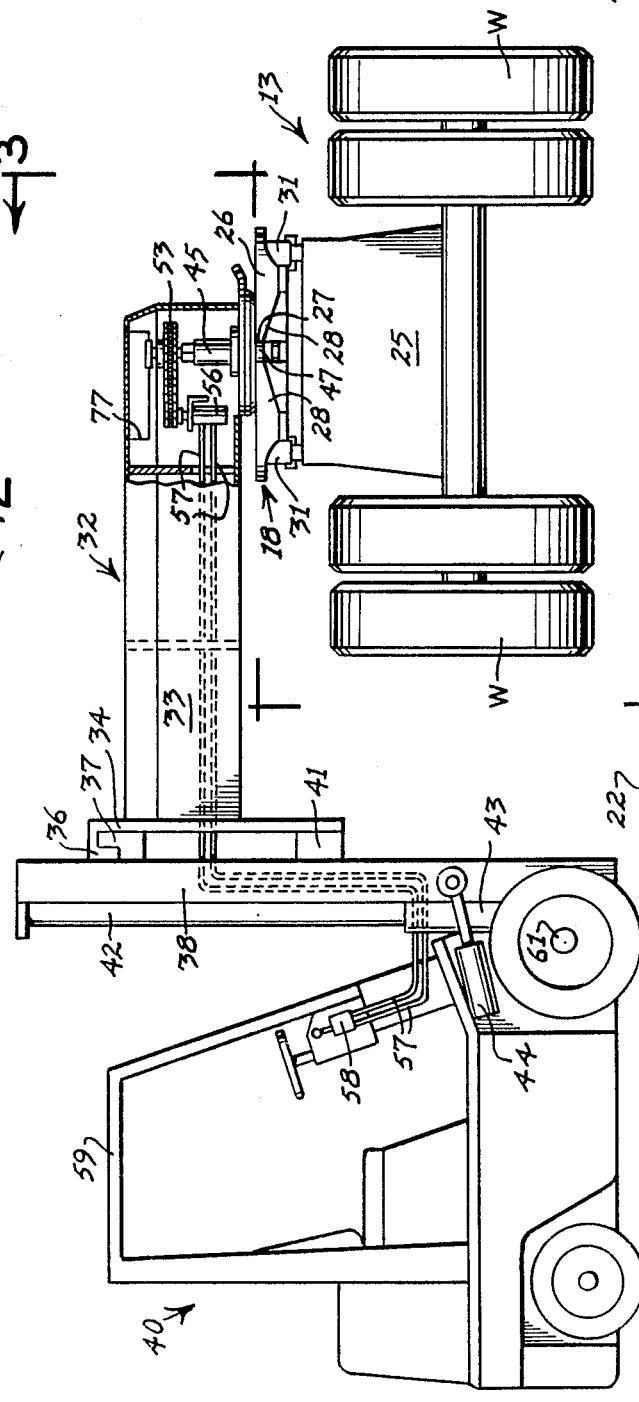
FIG. 2 is an enlarged elevational view taken along the line 2—2 of FIG. 1, illustrating the boom attachment supporting the carrier in an elevated position, with portions broken away.

Rigidly fixed to the connector pin or lock pin 47 below the bottom wall 46 of the boom housing 33 is a circular guide plate 50 adapted to ride over the top surface of the slide plate 26 when the lock pin 47 moves into locking position within the slot 27 of the fifth wheel 18, as best disclosed in FIGS. 2 and 4. The lower portion of the lock pin 47 including the annular pin recess 48 projects downward below the guide plate 50, as illustrated in FIG. 4.

In a preferred form of the invention, the wear plate 46 is generally circular and concentric with the guide plate 50. As shown in FIGS. 2 and 4, the wear plate 46 is substantially the same diameter as the guide plate 50. The front portion of the wear plate preferably has an upwardly curved extension or nose cam 66 for initially engaging the normally tilted fifth wheel slide plate 26 as the boom attachment 32 the carrier 13, and for depressing the slide plate 26 to a substantially horizontal position for slidably receiving the guide plate 50. The bottom surface of the wear plate 46 is thoroughly lubricated with grease to permit relatively frictionless rotary movement of the guide plate 50 beneath the fixed wear plate 46.

The upper portion of the lock pin 47 defines a shaft portion 51 to which is fixed a driven sprocket 52 engaging a chain 53 trained about a drive sprocket 54 fixed to a drive shaft 55 driven by a hydraulic motor 56. The motor 56 is preferably mounted upon bracket 65 fixed to the side walls of the boom housing 33. The hydraulic motor 56 is connected by hydraulic hose lines 57 to hydraulic controls 58 located within the cab 59 of the lift truck 40. By manipulating the hydraulic controls 58, the connector pin or lock pin 47, together with the guide plate 50, may be rotated in either direction to any desired rotary angle.

As best disclosed in FIG. 4, the connector pin shaft 51 is mounted within the journal housing 45 by a large nut 70 threadedly engaging the upper threaded end portion 71 of the pin shaft 51 and seated upon upper roller bearing 72. Upper and lower roller bearings 72 and 73, of conventional construction, are supported, vertically spaced, within the journal housing 45 for supporting the pin shaft 51 for rotary movement about the vertical axis of the connector pin 47.

A vertical stem 75 projects upward from the threaded end portion 71 and is coaxially keyed to the driven sprocket 52.

An opening 77 may be provided in the top of the boom housing 33 to facilitate adjustment and maintenance of the elements within the housing 33.

When the lock pin 47 is in its locked position within the slot 27 and the boom member 32 is raised by the lift truck, the weight of the carrier 13 is carried by the lower annular rim 67 of the lock pin 47 engaging beneath the catch 30 and possibly the trigger bar 29 (FIG. 4), if the trigger bar 29 is received within the annular recess 48. Because of the frictional engagement between the catch 30 and the lock pin rim 67 caused by the weight of the carrier 13, the carrier 13 will rotate with lock pin 47 when the lock pin 47 is rotatably driven by the hydraulic motor 56.

In the method of connecting a rear trailer 20 to a front trailer 12 in accordance with this invention, the rear trailer 20 is first parked or located in a stationary position upon the pavement 22 while a pre-connected tractor 11 and front trailer 12 are backed in substantially longitudinal alignment with the rear trailer 20 until the rear end of the front trailer 12 is spaced a limited distance, not less than the length of the mobile connector carrier 13, from the front end of the rear trailer 20, to form a working space 23, as illustrated in FIG. 1. Preferably, the forks, not shown, of a forklift truck 40 are removed from the mast 30, although in some situations, the forks may remain affixed to the mast of the forklift truck. The boom member 32 is then mounted upon the mast 30 by hanging the hook member 36 over the hanger bar 37 so that the lower portion of the mounting plate 34 abuts against the lower stabilizer bar 41 of the lift truck 40. Other means of supporting the rear end portion of the boom member 32 upon the mast 38 may also be utilized, so long as the boom member 32 is connected to the elevator mechanism of the lift truck 40, so that the boom member 32 may be raised and lowered simultaneously with the elevator mechanism.

The lift truck 40 is then driven by an operator to a location in which a carrier 13 or "JIFFLOX" is stored or parked, such as the location illustrated in phantom in FIG. 1. The lift truck 40 moves forwardly approaching the carrier 13 from the rear to longitudinally align the connector pin or lock pin 47 with the flared or diverging cam end portions 28 of the fifth wheel slot 27. The lock pin 47 is then forced forwardly along and within the slot 27 until the lock pin 47 engages and forces forward the trigger bar 29, causing the trigger bar 29 to pivot forward about the pivot pin 80 (FIG. 5), and force the catch 30 behind the lock pin 47 and into the annular recess 48. Simultaneously, the guide plate 50 slides over the top surface of the slide plate 26 until lock pin 47 is in its locked position within the fifth wheel 18, so that the lock pin 47 and slide plate 26 will move as a unit and the carrier 13 will be rotated relative to the boom member 32. The lift truck controls 58 are then operated to raise the boom member 32 and simultaneously the carrier 13.

The lift truck 40 is then moved, such as in the path 60 illustrated in FIG. 1, to move the carrier 13 toward the working space 23. If the carrier 13 is not disposed substantially at right angles to the boom member 32 with the tongue 16 projecting forward, then the operator manipulates controls 58 to rotate the lock pin 47, and the carrier 13 to the position disclosed in FIG. 1 so that the front-to-rear dimension of the carrier 13 is disposed in substantial longitudinal alignment with the longitudinal axis 24 of the trailers 12 and 20.

The carrier 13 is then lowered until the wheels W rest upon the ground or pavement surface 22. If the lift truck 40 is provided with a conventional lateral shifting mechanism, not shown, then this mechanism is actuated to shift the carrier 13 forward until the coupling on the front end of the tongue 16 is connected to the connector pintle or hook 17 on the rear of the front trailer 12. If the lift truck 40 is not provided with a conventional lateral shifting mechanism, then the operator may manipulate the lift truck 40 so that it rotates about a vertical axis through the front axle 61 of the lift truck to turn the rear wheels rearward and thereby swing the carrier 13 forward until the tongue 16 is coupled to the connector hook 17.

After the tongue 16 has been coupled to the front trailer 24, the lock pin 47 is manually unlocked from the fifth wheel 18 in a conventional manner and the lock pin 47 removed from the slot 27 by rearward movement of the boom member 32 until the lock pin 47 is clear of the fifth wheel 18. At this point, the lift truck 40 is backed away from the carrier 13 and moved to an out-of-the-way parking position.

The operator of the tractor 11 then moves the connected tractor 11, trailer 12 and carrier 13 rearward until the fifth wheel 18 is moved beneath the front end of the rear trailer 20 and the depending kingpin 19 is cooperatively engage with the fifth wheel 18 to couple the rear trailer 20 to the carrier 13. The entire tandem assembly 10 including the tractor 11, front trailer 12, carrier 13 and rear trailer 20 are completely assembled. The landing gear, not shown, on the rear trailer 20 may then be raised and the air and electrical connections made between the "JIFFLOX" or carrier 3 and the rear trailer 20 to render the tandem assembly 10 road-ready.

By utilizing the lift truck 40 and the boom attachment 32 as above described, the carrier or "JIFFLOX" 13 may be accurately and quickly located and connected between the front and rear trailers without any manual labor, except the disconnection of the boom member 32 from the carrier 13. Moreover, the "JIFFLOX" or carrier 13 is positioned and connected to the front trailer 12 and the rear trailer 20 with a minimum of working space 23 between the trailers to improve the accuracy of backing the carrier 13 into automatic connection with the kingpin 19 of the rear trailer 20. By eliminating the previous involvement of manual labor with the connection of the carrier 13 to the front trailer 12, the possibilities of injury to the operator of the mobile carrier 13 is substantially minimized, if not eliminated. Accordingly, both the safety and the speed of the tandem assembly operation is substantially improved.

What is claimed is:

1. An apparatus to facilitate the connection of a rear trailer to a front trailer in a tandem tractor-trailer assembly, comprising:
   (a) a mobile connector carrier comprising a chassis, ground-engaging wheels supporting said chassis, a tongue projecting forward from said chassis and terminating in a front connector adapted to be coupled to a cooperative connector on a rear end portion of a front trailer, a fifth wheel connector including a slide plate having a rearward opening slot therein supported on top of said chassis, said slot being adapted to receive and interlock with a king pin on a front end of a rear trailer,
   (b) an elongated boom member having front and rear end portions,
   (c) mounting means on the rear end portion of said boom member for supporting said boom member on a mast of a lift truck for vertical movement,
   (d) an elongated bearing member having a vertical axis mounted in the front end portion of said boom member,
   (e) an elongated lock pin having upper and lower end portions rotatably and coaxially journaled in said bearing member,
   (f) said lower end portion of said lock pin being adapted to be received in said slot and locked in said fifth wheel connector for rotational movement with said fifth wheel connector about said vertical axis, and
   (g) drive means in said boom member operatively connected to said lock pin for selectively rotating said lock pin.

2. The invention according to claim 1 further comprising a guide plate fixed to said lower end portion of said lock pin below said bearing member and adapted to move over said slide plate when said lock pin moves forward in said slot in said fifth wheel connector.

3. The invention according to claim 1 in which said drive means comprises a motor mounted in said boom member, and drive transmission means coupling said motor to said upper end portion of said lock pin for rotatably driving said lock pin.

4. The invention according to claim 3 in which said drive transmission means comprises a sprocket and chain transmission.

5. The invention according to claim 1 in which said mounting means comprises hook means for supporting the rear end portion of said boom member upon the cross frame of the lift truck.

6. A method of connecting a rear trailer to a front trailer in a tandem tractor-trailer assembly comprising the steps of:
   (a) positioning a rear trailer having a front end portion, a kingpin depending from said front end portion, and a longitudinal axis, in a parked position,
   (b) pre-assembling a tandem assembly, including the coupling of a front end portion of a front trailer having a longitudinal axis to a tractor, a rear end portion of said front trailer having a rear connector,
   (c) moving said tandem assembly rearward to a stationary position in which said front trailer is substantially in alignment with said rear trailer so that the rear end of said front trailer is spaced longitudinally from the front end of said rear trailer a predetermined operative distance to establish a working space between said front and rear trailers,
   (d) lifting, with a lift truck, a mobile connector carrier having a chassis, ground-engaging wheels supporting said chassis, a tongue projecting forward from said chassis and terminating in a front connector adapted to be coupled to said rear connector on the rear end portion of said front trailer, and a fifth wheel connector on top of said chassis,
   (e) moving said mobile connector carrier with said lift truck to position said mobile connector carrier within said working space,
   (f) rotating said mobile connector carrier relative to said lift truck in a substantially horizontal plane so that said tongue projects forward toward said front trailer when said mobile connector carrier is in said wording space,
   (g) manipulating said lift truck to move said mobile connector carrier a slight distance forward until said front connector on said mobile connector carrier cooperatively engages said rear connector on said front trailer to connect said mobile connector carrier to said front trailer,
   (h) separating and removing said lift truck from said mobile connector carrier,
   (i) moving said tandem assembly rearward until said kingpin cooperatively engages said fifth wheel connector to connect said mobile connector carrier to said rear trailer.

7. The method according to claire 6 further comprising the step of mounting a fifth wheel pin connector on said lift truck, and moving said lift truck to cause said pin connector to cooperatively engage said fifth wheel connector on said chassis to permit said lifting and rotating steps.

8. The method according to claim 6 further comprising the step of mounting an elongated beam having front and rear end portion upon a vertically movable mast of a lift truck, connecting the fifth wheel of the mobile connector carrier to a lock pin member rotatable supported in the front end portion of the boom member, and selectively rotating the lock pin member to rotate the mobile connector carrier in a substantially horizontal plane relative to the boom member in order to position said mobile connector carrier within said working space and to direct said tongue forward toward said front trailer.

* * * * *